(12) United States Patent
Seo et al.

(10) Patent No.: US 8,026,679 B2
(45) Date of Patent: Sep. 27, 2011

(54) HYBRID VEHICLE (75) Inventors: Nobuhide Seo, Hiroshima (JP);
Ryuichiro Amano, Hiroshima (JP); Kei Yonemori, Hiroshima (JP)

(73) Assignee: Mazda Motor Corporation (JP)

( * ) Notice: Subject to any disclaimer, the term of this patent is extended or adjusted under 35 U.S.C. 154(b) by 1166 days.

(21) Appl. No.: 11/798,978

(22) Filed: May 18, 2007

(65) Prior Publication Data

US 2007/0296359 A1   Dec. 27, 2007

(30) Foreign Application Priority Data

Jun. 7, 2006   (JP) .................................. 2006-158499

(51) Int. Cl.
*H02P 5/00*   (2006.01)

(52) U.S. Cl. ........ 318/139; 318/140; 318/800; 318/148; 318/801; 363/34; 363/37

(58) Field of Classification Search .................. 318/139, 318/140, 800, 148, 801; 363/34, 37
See application file for complete search history.

(56) References Cited

U.S. PATENT DOCUMENTS

| 5,475,293 | A | | 12/1995 | Sakai et al. | |
|---|---|---|---|---|---|
| 5,568,023 | A | * | 10/1996 | Grayer et al. ................. | 318/139 |
| 6,242,873 | B1 | * | 6/2001 | Drozdz et al. ................ | 318/139 |
| 6,329,772 | B1 | * | 12/2001 | Ochiai et al. .................. | 318/139 |
| 6,557,655 | B2 | * | 5/2003 | Ovshinsky et al. ....... | 180/65.245 |
| 6,672,415 | B1 | * | 1/2004 | Tabata ....................... | 180/65.25 |
| 6,859,693 | B2 | * | 2/2005 | Tamagawa et al. ............. | 701/22 |
| 7,122,991 | B2 | * | 10/2006 | Kitajima et al. .............. | 318/800 |
| 7,327,053 | B2 | * | 2/2008 | Eckardt et al. ................ | 307/126 |
| 7,609,022 | B2 | * | 10/2009 | Oyobe et al. .................. | 318/800 |
| 7,610,892 | B2 | * | 11/2009 | Butcher et al. ............. | 123/179.3 |
| 7,778,045 | B2 | * | 8/2010 | Alexander ....................... | 363/13 |
| 7,813,848 | B2 | * | 10/2010 | Seo et al. ........................ | 701/22 |
| 2003/0098298 | A1 | | 5/2003 | Dohmae et al. | |
| 2007/0274109 | A1 | | 11/2007 | Oyobe et al. | |
| 2007/0296359 | A1 | * | 12/2007 | Seo et al. ....................... | 318/139 |

FOREIGN PATENT DOCUMENTS

GB   2 149 241 A   6/1985

(Continued)

OTHER PUBLICATIONS

European Search Report dated Aug. 8, 2007 for European Application No. 07010170.4-1242, 9 pages.
Y. Mei et al., Application of Matrix Converter in Auxiliary Drive System for Diesel Locomotives, Industry Applications Conference, 2005, 40$^{th}$ IAS Annual Meeting, Conference Record of the 2005 Hong Kong, China, Oct. 2-6, 2005, IEEE, pp. 2476-2483.

(Continued)

*Primary Examiner* — Thomas G Black
*Assistant Examiner* — Wae Louie
(74) *Attorney, Agent, or Firm* — Studebaker & Brackett PC; Donald R. Studebaker (57) ABSTRACT A hybrid vehicle includes: first and second rotary electric machines; a matrix converter connecting the first and second rotary electric machines to each other to provide AC to AC power conversion between both the rotary electric machines; a battery connected to an electrical path branched off between the matrix converter and the second rotary electric motor; an inverter interposed among the battery, the matrix converter and the second rotary electric machine to convert AC power to DC power and vice versa; and a controller. The controller activates the first rotary electric machine with power fed from the battery and restrains the change in torque output of the second rotary electric machine at the activation of the first rotary electric machine.

6 Claims, 4 Drawing Sheets

FOREIGN PATENT DOCUMENTS

| | | |
|---|---|---|
| JP | 60-061475 A | 4/1985 |
| JP | 60-098595 A | 4/1994 |
| JP | 11-103585 A | 4/1999 |
| JP | 2001-286183 A | 10/2001 |
| JP | 2005-318731 A | 11/2005 |
| JP | 2006-025577 A | 1/2006 |
| WO | WO 2005/105511 A1 | 11/2005 |
| WO | WO 2005105511 A1 * | 11/2005 |

OTHER PUBLICATIONS

Japanese Office Action "Notice of Reasons for Rejection" dated Nov. 16, 2010; Japanese Patent Application No. 2006-158499 with translation.

* cited by examiner

HYBRID VEHICLE

BACKGROUND OF THE INVENTION (a) Field of the Invention

This invention relates to hybrid vehicles.

(b) Description of the Related Art

A generally known electrical system configuration of a hybrid vehicle includes a generator connected to an engine, an electric motor connected to a drive wheel and first and second inverters interposed between the generator and the electric motor to covert AC power to DC power or vice versa. In such a configuration, AC power generated in the generator is converted to DC power by the first inverter, the DC power is reconverted to AC power by the second inverter and the AC power is then fed to the electric motor.

However, since in the above configuration two inverters are interposed between the generator and the electric motor, this causes a problem of large power loss.

A hybrid vehicle is disclosed as an example of improvement for the above problem in PCT Publication WO 2005/105511 A1. The hybrid vehicle has an electrical system configuration in which a matrix converter for directly converting AC power to AC power is interposed between a generator and an electric motor.

The hybrid vehicle with the above configuration, however, has the following problems. Specifically, the electrical system of the hybrid vehicle is configured so that a matrix converter is interposed between a first rotary electric machine and a second rotary electric machine and a battery is connected via an inverter to an electrical path branched between the matrix converter and the second rotary electric machine. Therefore, the first rotary electric machine is connected to the battery via the inverter and the matrix converter and the second rotary electric machine is connected to the battery via the inverter only.

According to the above configuration, when electric power from the battery is fed to drive (activate) the first rotary electric machine, it is also fed to the second rotary electric machine. Thus, when the second rotary electric machine is already doing work, its torque output is increased. On the other hand, when the second rotary electric machine is stopped, an unnecessary torque is generated.

These problems occur where the first rotary electric machine is a generator connected to an engine and is used as a starter for the engine. Specifically, when driving electric power is fed from the battery through the inverter and the matrix converter to the generator (first rotary electric machine) in order to start the engine, driving electric power is also fed to the electric motor that is the second rotary electric machine. This causes the electric motor to generate an unnecessary torque output or unnecessarily increase the torque output.

SUMMARY OF THE INVENTION

The present invention has been made in view of the foregoing points and its object is to provide a hybrid vehicle that has an electrical system configuration in which first and second rotary electric machines are connected to each other via a matrix converter and prevents that when one of the rotary electric machines is activated, the other rotary electric machine changes its torque output.

In an aspect of the present invention, a hybrid vehicle comprises: first and second rotary electric machines each functioning as an electric motor or a generator according to the operating mode of the vehicle; a matrix converter connecting the first and second rotary electric machines to each other to provide AC to AC power conversion between both the rotary electric machines; a battery connected to an electrical path branched off between the matrix converter and the second rotary electric motor; an inverter interposed among the battery, the matrix converter and the second rotary electric machine to convert AC power to DC power and vice versa; an activating means for activating the first rotary electric machine with power fed from the battery; and a torque restraining means for restraining the change in torque output of the second rotary electric machine when the activating means activates the first rotary electric machine.

With the above configuration, the matrix converter exists between the first and second rotary electric machines and directly converts AC power to AC power. Therefore, where one of the first and second rotary electric machines is a generator and the other is an electric motor, power generated by the generator can be directly converted to power to be fed to the electric motor, which increases the energy efficiency.

Furthermore, when the activating means activates the first rotary electric machine with power fed from the battery connected to the electrical path branched off between the matrix converter and the second rotary electric machine, power is also fed to the second rotary electric machine. Normally, this would change the torque output of the second rotary electric machine. However, with the above configuration, the torque restraining means restrains the change in torque output of the second rotary electric machine. The term "change in torque output" here includes torque generation from a torque output of zero.

The first rotary electric machine may be a generator connected to the output shaft of an engine and capable of being driven by the engine, the second rotary electric machine may be an electric motor connected to a drive wheel to output a driving force to the drive wheel, the activating means may be configured to activate the first rotary electric machine and thereby start the engine, and the torque restraining means may be configured to restrain the change in torque output of the second rotary electric machine at the start of the engine.

Since the first rotary electric machine is connected to the output shaft of the engine, it can function as a generator and also as a starter for the engine. Furthermore, since the second rotary electric machine is connected to the drive wheel, it can function as an electric motor and also regenerate electric power. The regenerated power is stored through the inverter into the battery. With this configuration, since only the inverter is interposed between the second rotary electric machine and the battery, the storage efficiency of regenerated power is high.

Furthermore, when the engine is started by the activation of the first rotary electric machine, the torque restraining means restrains the change in torque output of the second rotary electric machine. Thus, it can be prevented that an unnecessary torque is generated during parking of the hybrid vehicle and that an unnecessary torque variation occurs during travel of the hybrid vehicle.

The torque restraining means is preferably configured, in activating the first rotary electric machine, to change the control specification according to the operating condition of the second rotary electric machine.

Specifically, where the first and second rotary electric machines are three-phase electric machines, in activating the first rotary electric machine during stop of the second rotary electric machine, the torque restraining means may control the inverter and the matrix converter to allow the inverter to output single-phase power and allow the matrix converter to output three-phase power to the first rotary electric machine.

Thus, single-phase power output from the inverter is fed to each of the matrix converter and the second rotary electric machine. Since the second rotary electric machine is a three-phase electric machine, it does not produce any rotating magnetic field even after fed with single-phase power and, therefore, generates no torque.

On the other hand, the matrix converter converts the single-phase power to three-phase power and outputs it to the first rotary electric machine. Thus, the first rotary electric machine can be driven.

Alternatively, where the first and second rotary electric machines are synchronous electric machines, in activating the first rotary electric machine during stop of the second rotary electric machine, the torque restraining means may control the inverter and the matrix converter to allow the inverter to output AC power with a different frequency from the driving frequency of the second rotary electric machine and allow the matrix converter to output AC power with substantially the same frequency as the driving frequency of the first rotary electric machine to the first rotary electric machine.

In this case, since AC power output from the inverter has a different frequency from the driving frequency (synchronous speed) of the second rotary electric machine, the second rotary electric machine generates no torque.

On the other hand, since the matrix converter converts the AC power to AC power with substantially the same frequency as the driving frequency of the first rotary electric machine (i.e., any frequency within the frequency range in which the synchronous electric machines are rotatable) and outputs it to the first rotary electric machine, the first rotary electric machine can be driven.

The torque restraining means is preferably configured to allow the inverter to output AC power with a higher frequency than the driving frequency of the second rotary electric machine.

For example, if the inverter feeds AC power with a lower frequency than the driving frequency of the second rotary electric machine to the second rotary electric machine, the frequency of the AC power may temporarily coincide with the driving frequency of the second rotary electric machine in fixed cycles to sporadically produce torque outputs in pulses. In contrast, according to the above preferred configuration, since the inverter feeds AC power with a higher frequency than the driving frequency of the second rotary electric machine, the production of such pulses can be surely prevented. In addition, the feeding of AC power with a higher frequency than the driving frequency provides an inductance load of the second rotary electric machine. This avoids useless power consumption.

In activating the first rotary electric machine during operation of the second rotary electric machine, the torque restraining means may control the inverter and the matrix converter to keep the driving voltage applied to the second rotary electric machine at a constant value and allow the matrix converter to output driving electric power necessary to drive the first rotary electric machine to the first rotary electric machine.

Thus, since the driving voltage applied to the second rotary electric machine is constant, the torque output of the second rotary electric machine does not change. On the other hand, since the first rotary electric machine is fed through the matrix converter with driving electric power necessary to drive the first rotary electric machine, it can be driven.

DETAILED DESCRIPTION OF THE INVENTION

Embodiment 1

Figure 1:
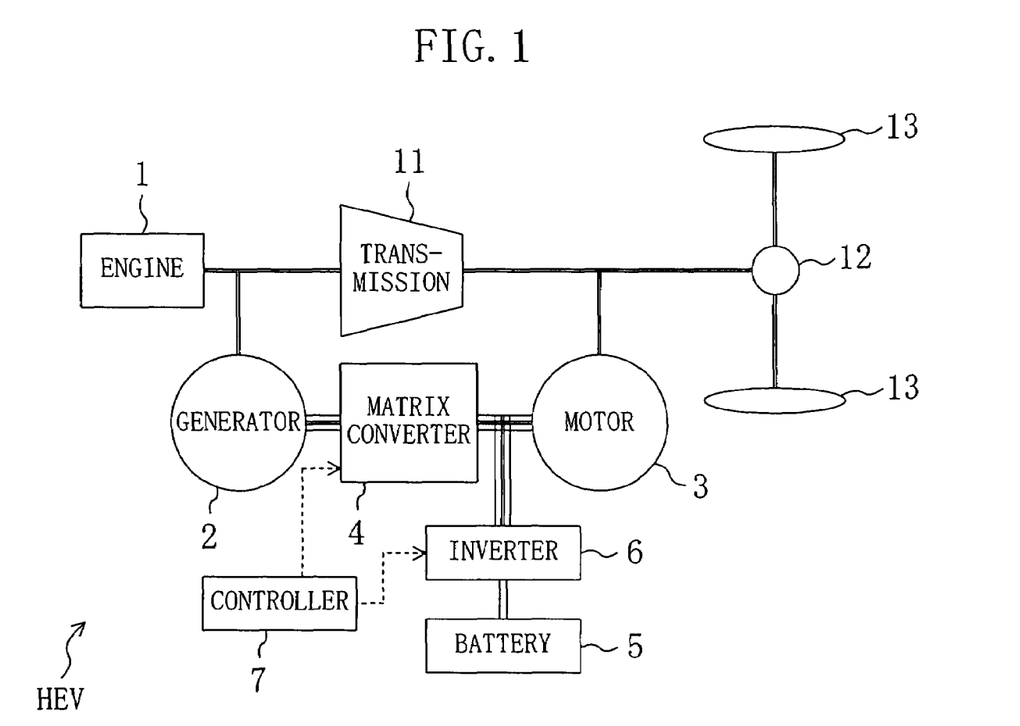
FIG. 1 is a schematic block diagram showing the structure of a hybrid vehicle.

FIG. 1 is a block diagram showing a schematic structure of a hybrid vehicle HEV according to an embodiment of the present invention. In the figure, reference numeral 1 denotes an engine that is an internal combustion engine, reference numeral 2 denotes a generator (a first rotary electric machine), reference numeral 3 denotes an electric motor (a second rotary electric machine), reference numeral 4 denotes a matrix converter, reference numeral 5 denotes a battery and reference numeral 6 denotes an inverter.

In the hybrid vehicle HEV, the output of the engine 1 is transmitted through a transmission 11 and a differential gear 12 to drive wheels 13 and 13. The output side of the transmission 11 is connected to the electric motor 3 and, therefore, the output of the electric motor 3 is also transmitted to the drive wheels 13. The drive wheels 13 can be driven by the electric motor 3 only, by the engine 1 only, or by both the electric motor 3 and the engine 1. The type of transmission 11 used is not particularly limited and can be appropriately selected. Instead of the transmission 11, a power split mechanism, for example, formed of a planetary gear, may be disposed between the engine 1 and the drive wheels 13 and connected to the electric motor 3. Furthermore, the power train configuration of the hybrid vehicle HEV is not limited to the above so long as it has the later-described electrical system.

In this embodiment, the generator 2 is a three-phase alternating current synchronous generator. The generator 2 is connected to the output shaft of the engine 1 and driven by the engine 1 to generate electric power. Furthermore, as described later, the generator 2 is fed with electric power from the battery 5 to act as an electric motor, thereby serving as a starter for the engine 1.

In this embodiment, the electric motor 3 is a three-phase alternating current synchronous motor. The electric motor 3 is connected via the matrix converter 4 to the generator 2 and driven by supply of electric power generated by the generator 2 and/or supply of electric power from the battery 5. Furthermore, during deceleration and braking of the hybrid vehicle HEV, the electric motor 3 acts as a generator by receiving power from the drive wheels 13 (regenerates electric power). The regenerated electric power is stored in the battery 5.

The battery 5 is a direct current power supply made of a secondary battery, such as a nickel hydride battery or a lithium ion battery, or made of a capacitor and connected via the inverter 6 to an electrical path branched off between the matrix converter 4 and the electric motor 3.

Figure 2:
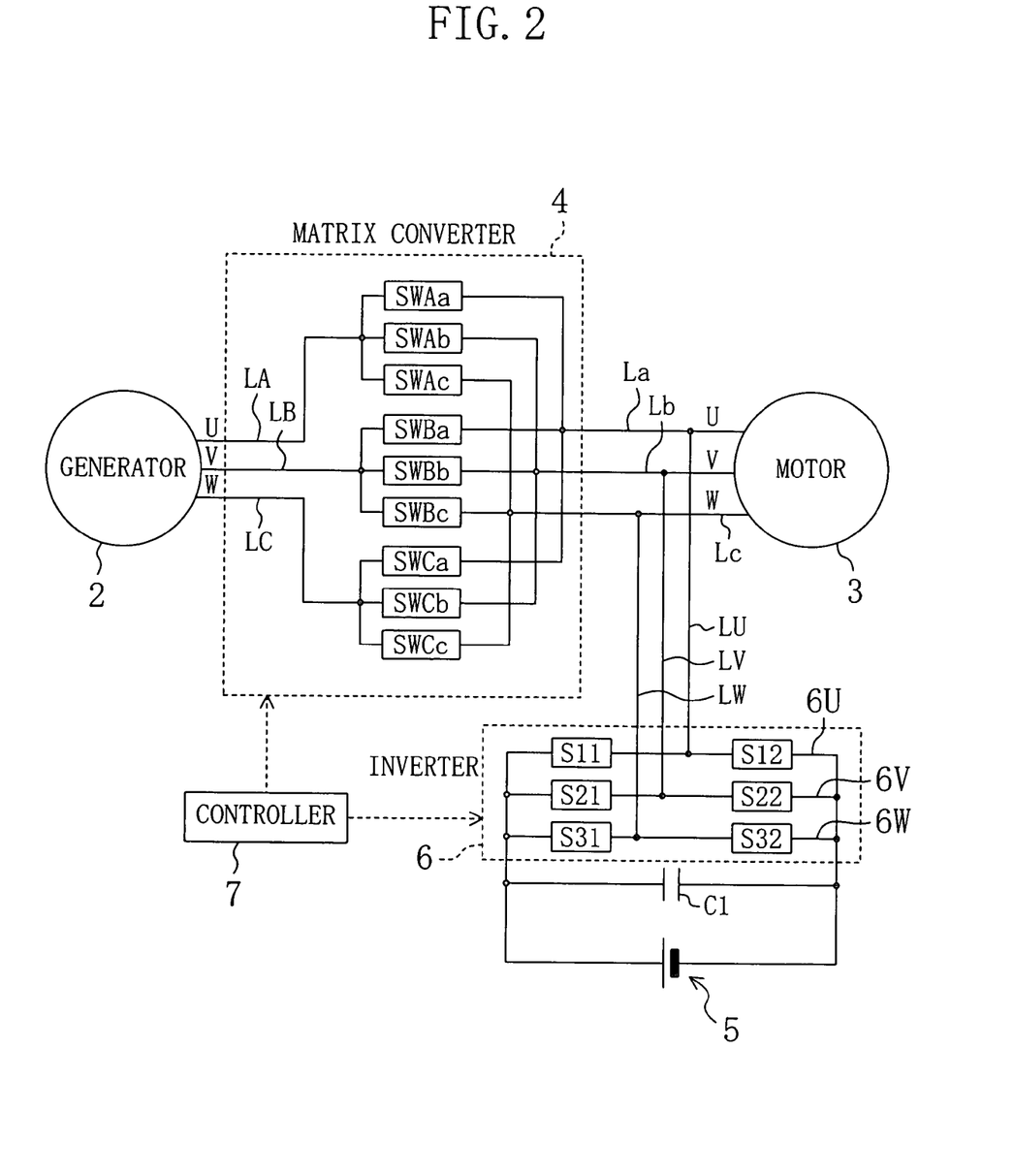
FIG. 2 is a circuit diagram showing the configuration of the electrical system of the hybrid vehicle.

FIG. 2 shows a circuit configuration of the electrical system of the hybrid vehicle HEV. Note that detector sensors, such as a voltage sensor and a current sensor, are appropriately attached to this circuit but not given in FIG. 2.

The matrix converter 4 is an electric power converter for directly converting AC power to AC power with a given frequency or a given voltage. As shown in FIG. 2, the matrix converter 4 includes nine bidirectional switches SWAa, SWAb, SWAc, SWBa, SWBb, SWBc, SWCa, SWCb and SWCc and lines LA, LB, LC, La, Lb and Lc.

The lines LA, LB and LC are connected to the U-phase, V-phase and W-phase, respectively, of the generator 2 and the lines La, Lb and Lc are connected to the U-phase, V-phase and W-phase, respectively, of the electric motor 3.

The nine bidirectional switches SWAa, SWAb, SWAc, SWBa, SWBb, SWBc, SWCa, SWCb and SWCc are arranged in a matrix of three lines and three columns. The bidirectional switch SWAa is connected between the line LA and the line La, the bidirectional switch SWBa is connected between the line LB and the line Lb, and the bidirectional switch SWCa is connected between the line LC and the line Lc.

The bidirectional switch SWAb is connected between the line LA and the line Lb, the bidirectional switch SWBb is connected between the line LB and the line Lb, and the bidirectional switch SWCb is connected between the line LC and the line Lb.

The bidirectional switch SWAc is connected between the line LA and the line Lc, the bidirectional switch SWBc is connected between the line LB and the line Lc, and the bidirectional switch SWCc is connected between the line LC and the line Lc.

Thus, three lines and three columns of switches SWAa, SWAb, SWAc, SWBa, SWBb, SWBc, SWCa, SWCb and SWCc are disposed between the lines LA to LC serving as three-phase outputs of the generator 2 and the lines La to Lc serving as three-phase inputs of the electric motor 3.

Figure 3:
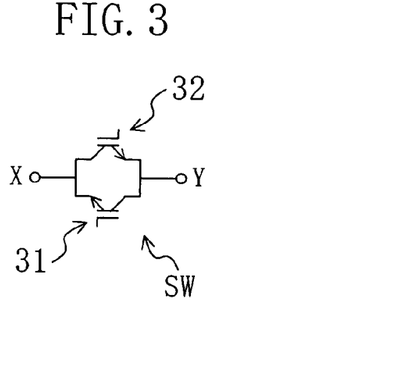
FIG. 3 shows an example of the structure of a switch in a matrix converter.

FIG. 3 shows an example of the structure of each bidirectional switch SW. The switch SW includes a first IGBT element 31 and a second IGBT element 32. The first IGBT element 31 has a reverse blocking function by connecting its emitter to a terminal X and connecting its collector to a terminal Y, and the second IGBT element 32 also has a reverse blocking function by connecting its emitter to the terminal Y and connecting its collector to the terminal X. The switch SW is configured so that the two IGBT elements 31 and 32 are connected in parallel.

The first and second IGBT elements 31 and 32 switch into the conducting state when a controller 7 activates their gates. At the time, when the terminal Y has a higher voltage than the terminal X, current flows through the first IGBT element 31. Although at the time reverse voltage is applied to the second IGBT element 32, the second IGBT element 32 does not permit the flow of current since it is a reverse blocking IGBT. On the other hand, when the terminal X has a higher voltage than the terminal Y, current flows through the second IGBT element 32. In this manner, the switch SW acts as a bidirectional switch.

The structure of the switch SW is not limited to the structure shown in FIG. 3. For example, although not shown, the switch SW may have a structure in which, instead of an IGBT element having reverse blocking function, an IGBT element and a diode are connected in series with each other.

As described above, the matrix converter 4 having the above structure is a device for converting AC power to AC power and outputs sinusoidal AC power with a given frequency through the control of the controller 7 over the switches SWAa, SWAb, SWAc, SWBa, SWBb, SWBc, SWCa, SWCb and SWCc. Thus, the matrix converter 4 directly converts three-phase AC power generated by the generator 2 to three-phase AC power for driving the electric motor 3 and outputs it. As a result, power loss is reduced as compared with the case where AC-DC-AC power conversion is performed by two inverters as in the prior art.

The inverter 6 in this embodiment, as shown in FIG. 2, is composed of a three-phase bridge circuit including a U-phase arm 6U, a V-phase arm 6V and a W-phase arm 6W and performs AC to DC and DC to AC power conversion.

Figure 4:
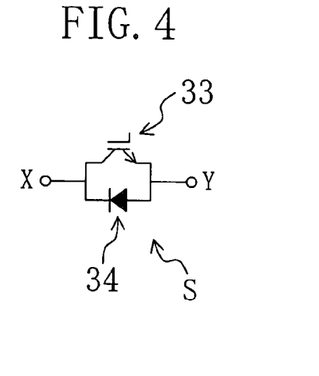
FIG. 4 shows an example of the structure of a switch in an inverter.

The U-phase arm 6U, the V-phase arm 6V and the W-phase arm 6W include a pair of switches S11 and S12 connected in series, a pair of switches S21 and S22 connected in series, and a pair of switches S31 and S32 connected in series, respectively. Each switch S, as shown in FIG. 4, includes an IGBT element 33 and a diode 34 connected in parallel with the IGBT element 33 so that the direction from the emitter to the collector is a forward direction.

A line LU connects a connection point between the pair of switches S11 and S12 of the U-phase arm 6U to the U-phase of the electric motor 3, a line LV connects a connection point between the pair of switches S21 and S22 of the V-phase arm 6V to the V-phase of the electric motor 3, and a line LW connects a connection point between the pair of switches S31 and S32 of the W-phase arm 6W to the W-phase of the electric motor 3.

Through the control of the controller 7 over each switch S of the inverter 6, the inverter 6 converts DC power output from the battery 5 to AC power and outputs it through the U-, V- and W-phase lines LU, LV and LW and it converts AC power input through the lines LU, LV and LW to DC power and outputs it to the battery 5.

A condenser C1 is provided to reduce the effect on the inverter 6 due to voltage variation.

According to the above configuration, the hybrid vehicle HEV, at start and during low-speed travel, receives power supply from the battery 5 and travels with the electric motor 3 only. Then, during normal travel, the hybrid vehicle HEV keeps the engine 1 running to transmit the engine power to the drive wheels 13 and use the engine power to generate electric power in the generator 2. Then, the hybrid vehicle HEV feeds the generated electric power through the matrix converter 4 to the electric motor 3 and travels with both the engine 1 and the electric motor 3.

During deceleration and braking, the hybrid vehicle HEV converts power from the drive wheels 13 to electric energy in the electric motor 3 (generator) and stores the regenerated electric power into the battery 5. The above configuration of the electrical system exhibits a high storage efficiency of regenerated electric power since a single inverter 6 is interposed between the electric motor 3 and the battery 5.

Furthermore, when the amount of electric power stored in the battery 5 becomes small, the hybrid vehicle HEV starts the engine 1 to drive the generator 2, thereby charging the battery 5.

In the above manner, the hybrid vehicle HEV starts the engine 1 when needed during travel or parking. The start of the engine 1 is implemented, as described above, by feeding electric power from the battery 5 to the generator 2 to function the generator 2 as a starter.

At the engine start, since the electric motor 3 is connected to the battery 5 via the inverter 6 only as shown in FIG. 2, the output electric power from the inverter 6 is fed to both the matrix converter 4 and the electric motor 3. Thus, it might be considered that, when the electric motor 3 is moving (for example, when the hybrid vehicle HEV transfers from a starting mode to a normal traveling mode), the output electric power is superposed on the applied voltage of the electric motor 3, which increases the torque output of the electric motor 3. Furthermore, it might also be considered that, when the electric motor 3 is stopped (for example, when the battery 5 is charged during parking), the driving voltage for the electric motor 3 is generated, which produces a torque output of the electric motor 3.

To cope with these problems, in the hybrid vehicle HEV of this embodiment, the controller 7 controls the matrix converter 4 and/or the inverter 6 to restrain the change in torque output of the electric motor 3 at the start of the engine 1.

Figure 5A:
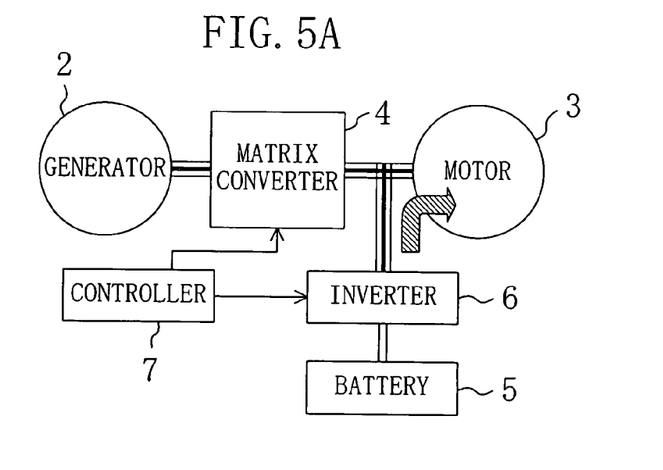
FIG. 5A is a diagram illustrating a control state when an electric motor is moving and before an engine starts.
Figure 5B:
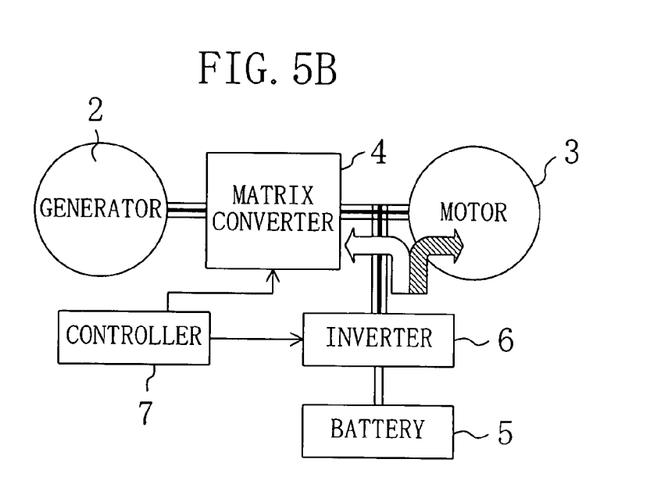
FIG. 5B is a diagram illustrating a control state in starting the engine while the electric motor is moving.

Specifically, at the start timing of the engine 1, the controller 7 checks the operating condition of the electric motor 3 with a voltage sensor or an electric current sensor. If the electric motor 3 is moving (see FIG. 5A), as shown in FIG. 5B, the controller 7 controls the inverter 6 to output the sum of driving electric power for the electric motor 3 and driving electric power for the generator 2 from the inverter 6 in order to additionally secure electric power towards the matrix converter 4. Concurrently, in order to keep the driving voltage applied to the electric motor 3 at a constant value, the controller 7 controls the matrix converter 4 to allow the matrix converter 4 to take the driving electric power for the generator 2. In this manner, without changing the electric power to be fed to the electric motor 3 (see the shaded arrows in FIGS. 5A and 5B), the driving electric power is fed to the generator 2 (see the unfilled arrow in FIG. 5B). Thus, without changing the torque output of the electric motor 3, the generator 2 can be activated to start the engine 1.

Figure 6:
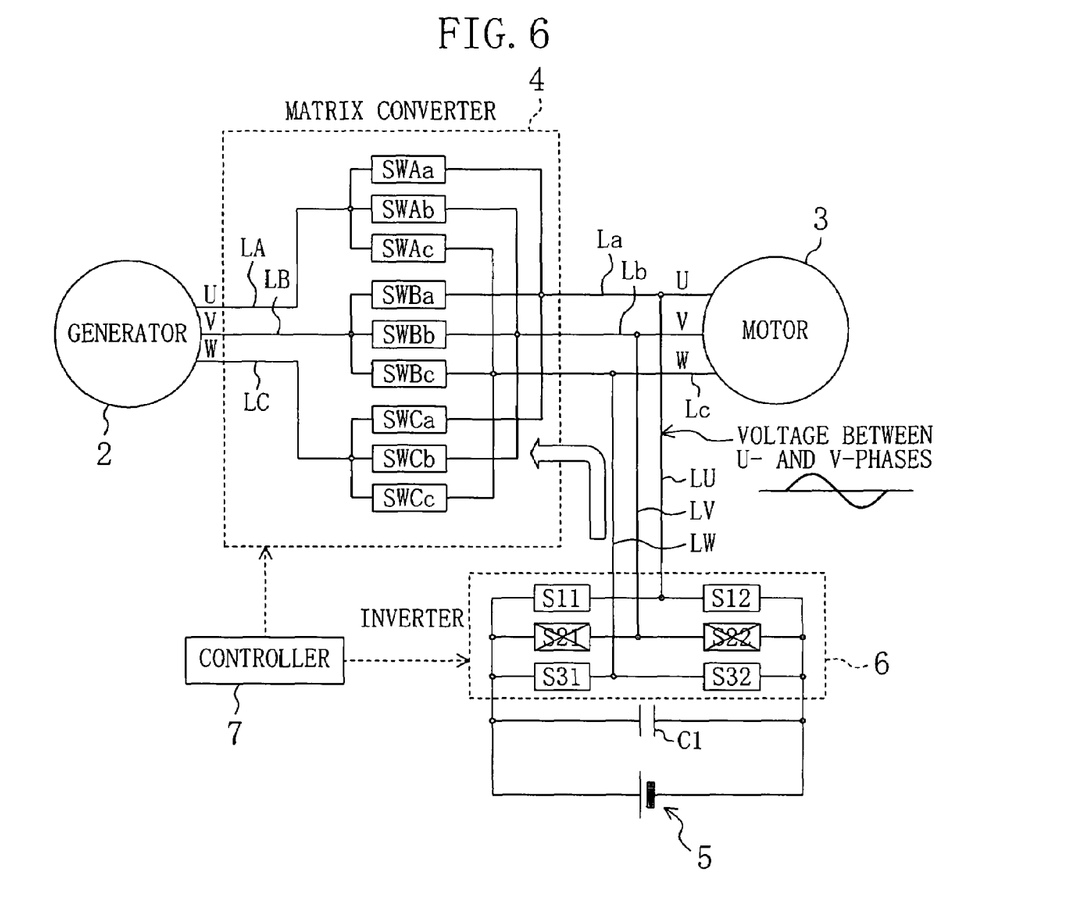
FIG. 6 is a diagram illustrating a control for starting the engine while the electric motor is stopped.

On the other hand, if the electric motor 3 is stopped, as shown in FIG. 6, the controller 7 controls the inverter 6 to inhibit, out of the three pairs of switches, one pair of switches S associated with one phase from being electrically conducted and thereby allows the inverter 6 to output single-phase electric power (in the example shown, the pair of V-phase switches S21 and S22 are deactivated). Thus, the electric motor 3 that is a three-phase electric motor produces no rotating magnetic field and the electric motor 3 does not move.

Furthermore, the controller 7 controls the matrix converter 4 to convert the input single-phase electric power (see the unfilled arrow) to three-phase electric power and output it. Thus, the generator 2 that is a three-phase generator can be activated to enable the start of the engine 1.

Since the hybrid vehicle HEV according to this embodiment restrains the change in torque output of the electric motor 3 in the above manner at the start of the engine 1, it prevents an unnecessary torque from being generated during parking and prevents an unnecessary torque variation from occurring during travel.

Note that in this embodiment an induction generator and an induction motor may be employed as a generator 2 and an electric motor 3, respectively.

Embodiment 2

Figure 7:
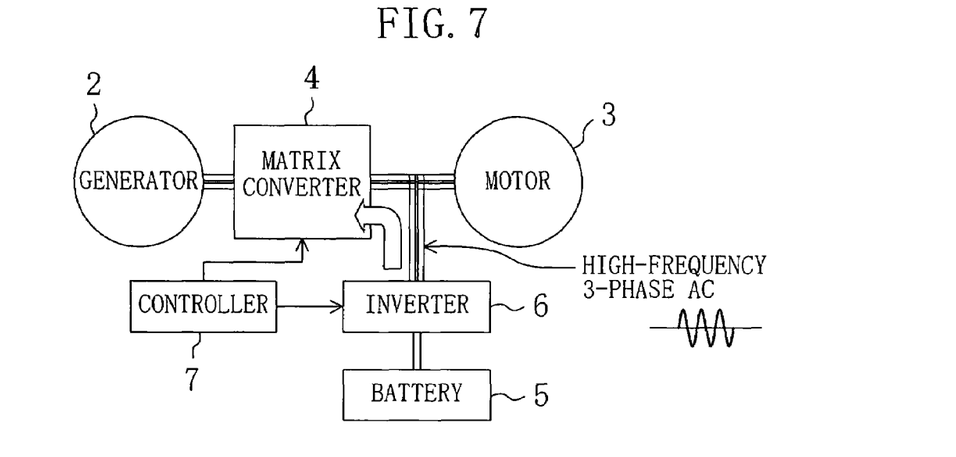
FIG. 7 is a diagram illustrating another control for starting the engine while the electric motor is stopped.

Embodiment 2 is different from Embodiment 1 in the control during stop of the electric motor 3. Specifically, during stop of the electric motor 3, as shown in FIG. 7, the controller 7 controls the inverter 6 to allow the inverter 6 to output AC power with a higher frequency than the driving frequency (synchronous speed) of the electric motor 3. Thus, the electric motor 3 that is a synchronous motor does not move because of step-out.

Furthermore, the controller 7 controls the matrix converter 4 to allow the matrix converter 4 to reduce the frequency of the input AC power down to the driving frequency of the generator 2 and output it. Thus, the generator 2 that is a synchronous generator can be activated to enable the start of the engine 1.

Also according to the above control, the change in torque output of the electric motor 3 is restrained at the start of the engine 1. Therefore, it can be prevented that an unnecessary torque is generated during parking and that an unnecessary torque variation occurs during travel.

Furthermore, according to the above control, AC power with a higher frequency than the driving frequency of the electric motor 3 is fed from the inverter 6 to the electric motor 3. It provides an inductance load of the electric motor 3. Therefore, power consumption can be saved.

The controller 7 may allow the inverter 6 to output AC power with a lower frequency than the driving frequency of the electric motor 3. However, when AC power with a lower frequency than the driving frequency is fed to the electric motor 3, the frequency of AC power may temporarily coincide with the driving frequency in fixed cycles to sporadically produce torque outputs in pulses. Furthermore, when the frequency of AC power fed to the electric motor 3 is low, a short-circuit may occur, which is disadvantageous in power consumption.

Embodiment 3

Embodiment 3 is a combination of Embodiments 1 and 2. During stop of the electric motor 3, the controller 7 controls the inverter 6 to inhibit, out of the three pairs of switches, one pair of switches S associated with one phase from being electrically conducted, thereby allowing the inverter 6 to output single-phase electric power, and to output the single-phase electric power with a higher frequency than the driving frequency of the electric motor 3. Thus, the electric motor 3 does not move.

Furthermore, the controller 7 controls the matrix converter 4 to convert input single-phase, high-frequency AC power to three-phase AC power with substantially the same frequency as the driving frequency of the generator 2 and output it. Thus, the generator 2 that is a three-phase alternating current synchronous generator can be activated to enable the start of the engine 1.

The electrical system configuration of a hybrid vehicle according to the present invention is not limited to the above configuration in which a generator is used as a first rotary electric machine and an electric motor is used as a second rotary electric machine. The present invention is widely applicable to any electrical system configuration in which a matrix converter is interposed between first and second rotary electric machines and a battery is connected via an inverter to an electrical path branched off between the matrix converter and the second rotary electric machine.

The present invention is not limited to the above embodiments but can be implemented in various forms without departing from its spirit and essential characteristics. The above embodiments should therefore be considered in all respects as illustrative only but not restrictive. The scope of the invention is indicated by the claims but not at all restricted to the description. Furthermore, all modifications and changes which come within the range of equivalents of the claims are intended to be embraced within the scope of the invention.

What is claimed is:

1. A hybrid vehicle comprising:
   first and second rotary electric machines each functioning as an electric motor or a generator according to the operating mode of the vehicle;

a matrix converter connecting the first and second rotary electric machines to each other to provide AC to AC power conversion between both the rotary electric machines;

a battery connected to an electrical path branched off between the matrix converter and the second rotary electric motor;

an inverter interposed among the battery, the matrix converter and the second rotary electric machine to convert AC power to DC power and vice versa; and a controller for activating the first rotary electric machine with power fed from the battery and restraining the change in torque output of the second rotary electric machine at the activation of the first rotary electric machine:

wherein the first rotary electric machine is a generator connected to the output shaft of an engine and capable of being driven by the engine, the second rotary electric machine is an electric motor connected to a drive wheel to output a driving force to the drive wheel, and the controller is configured to activate the first rotary electric machine, thereby starting the engine, and to restrain the change in torque output of the second rotary electric machine at the start of the engine.

2. A hybrid vehicle comprising:

first and second rotary electric machines each functioning as an electric motor or a generator according to the operating mode of the vehicle;

a matrix converter connecting the first and second rotary electric machines to each other to provide AC to AC power conversion between both the rotary electric machines;

a battery connected to an electrical path branched off between the matrix converter and the second rotary electric motor;

an inverter interposed among the battery, the matrix converter and the second rotary electric machine to convert AC power to DC power and vice versa; and a controller for activating the first rotary electric machine with power fed from the battery and restraining the change in torque output of the second rotary electric machine at the activation of the first rotary electric machine:

wherein the controller is configured, in activating the first rotary electric machine, to change the control specification according to the operating condition of the second rotary electric machine.

3. The hybrid vehicle of claim 2, wherein the first and second rotary electric machines are three-phase electric machines, and in activating the first rotary electric machine during stop of the second rotary electric machine, the controller controls the inverter and the matrix converter to allow the inverter to output single-phase power and allow the matrix converter to output three-phase power to the first rotary electric machine.

4. The hybrid vehicle of claim 2, wherein the first and second rotary electric machines are synchronous electric machines, and in activating the first rotary electric machine during stop of the second rotary electric machine, the controller controls the inverter and the matrix converter to allow the inverter to output AC power with a different frequency from the driving frequency of the second rotary electric machine and allow the matrix converter to output AC power with substantially the same frequency as the driving frequency of the first rotary electric machine to the first rotary electric machine.

5. The hybrid vehicle of claim 4, wherein the controller is configured to allow the inverter to output AC power with a higher frequency than the driving frequency of the second rotary electric machine.

6. The hybrid vehicle of claim 2, wherein, in activating the first rotary electric machine during operation of the second rotary electric machine, the controller controls the inverter and the matrix converter to keep the driving voltage applied to the second rotary electric machine at a constant value and allow the matrix converter to output driving power necessary to drive the first rotary electric machine to the first rotary electric machine.

* * * * *